United States Patent Office 3,455,861
Patented July 15, 1969

3,455,861
STABLE AQUEOUS DISPERSIONS OF TERNARY COPOLYMERS
Angelo Bresciani and Alberto Deflorin, Bergamo, Italy, assignors to Ciba Limited, Basel, Switzerland, a Swiss company
No Drawing. Filed Mar. 22, 1966, Ser. No. 536,289
Claims priority, application Italy, Mar. 24, 1965, 6,289/65
Int. Cl. C08f *1/13, 15/40, 1/62*
U.S. Cl. 260—29.6        5 Claims

ABSTRACT OF THE DISCLOSURE

New terpolymers are provided which are obtained by redox polymerization of
(a) 1–4 parts by weight of acrolein,
(b) 10–20 parts by weight of acrylonitrile, and
(c) 79–85 parts by weight of ethylacrylate, the sum of (a), (b) and (c) being 100 parts by weight.

The terpolymers of this invention are especially suitable for forming an elastic coating on paper, textiles and leather.

---

The present invention provides stable aqueous dispersions of ternary copolymers which are particularly suitable for leather dressing and are obtained when
(a) 1 to 4 parts by weight of acrolein,
(b) 10 to 20 parts by weight of acrylonitrile and
(c) 79 to 85 parts by weight of ethyl acrylate—where the sum $(a+b+c)$ is always 100 parts by weight—are emulsified in an aqueous medium in the presence of an emulsifier and the resulting emulsion is copolymerized by the redox method in the presence of hydrogen peroxide as oxidizing component and of ascorbic acid as reducing component and, if desired or required, of a small quantity of Fe(II)-ions as activator.

According to the preferred variant of the present process there are used
(a) 1.5 to 3 parts by weight of acrolein,
(b) 12 to 18 parts by weight of acrylonitrile and
(c) 80 to 84 parts by weight of ethyl acrylate.

The optional addition of Fe(II)-ions as activator in the polymerization may be, for example, in the form of ferrous sulfate or preferably of Mohr's salt

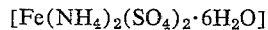
$$[Fe(NH_4)_2(SO_4)_2 \cdot 6H_2O]$$

The redox components are generally used in approximately equivalent proportions. As a rule, 0.004 to 0.009 mol of redox component for every mol of polymerizable compound is used. The amount of the optionally added activator may vary with the desired polymerization degree.

Suitable emulsifiers are conventional cationic and above all anionic dispersants, for example alkyl sulfonates, fatty alcohol sulfates such as sodium laurylsulfate, salts of higher sulfocarboxylic acid or nonionic dispersants, for example polyglycol ethers of higher fatty alcohols such as cetyl, oleyl or octadecyl alcohol. Apart from such capillary active dispersants there may be added hydrophilic protective colloids, especially those which contain no alcoholic hydroxyl groups on the polymer chain, for example polyacrylic acid, polyvinylpyrrolidone, copolymers of vinylpyrrolidone with acrylic acid, higher polyethylene oxides and primarily water-soluble copolymers of ethylene oxide with propylene oxide.

The polymer emulsions of this invention may be manufactured in the usual technical apparatus. The manufacturing procedure may involve two stages: In a first stage the emulsion of the starting material is produced which is then subjected to polymerization in a second operational stage.

The polymerization is advantageously conducted at a relatively low temperature ranging from 10 to 40° C., especially from 10 to 30° C. Since in the course of the polymerization substantial amounts of heat are often released, there should be provided efficient cooling means to enable the desired polymerization temperatures to be maintained; this is specially necessary when large emulsion batches come up for polymerization. To utilize the released heat and to facilitate control of the polymerization temperature it has proved particularly advantageous to use initially of a certain amount of emulsion to be processed only a small share and to trigger the polymerization in this share in the polymerization apparatus. As soon as the temperature in this share of the emulsion has reached the desired level, for example 25 to 30° C., the remainder of the cold emulsion is run in so slowly that the temperature can be kept constant. Towards the end of the polymerization it may be advantageous to supply external heat to raise the internal temperature to, for example, 75 to 80° C.

Furthermore, it is of advantage to conduct the polymerization in the absence of air or oxygen and in the presence of an inert gas, such as nitrogen or carbon dioxide.

The polymerization process of this invention may be conducted continuously, though the batchwise variant is preferred.

For stabilization any unreacted acrolein is advantageously removed by blowing it out of the resulting aqueous polymer dispersion with an inert gas; the pH of the dispersion is then rendered weakly alkaline, for example adjusted to 8, generally by adding alkali.

By virtue of their high dispersity and stability towards protective colloids and pigments the aqueous dispersions of this invention are excellently suited for the manufacture of firmly adhering, elastic coatings, preferably on paper and textile materials and above all on leather.

The coatings on leather obtained in this manner are distinguished from coatings obtained with known aqueous polymer dispersions in an unexpected manner by their outstanding adhesion, high abrasive resistance in the wet state and very good stability to ironing with a hot iron.

Before their application there may be further added to the aqueous dispersions of this invention cross-linking agents, especially those which contain at least two hydroxyl groups or groups of the formula NH<. As relevant examples there may be mentioned, polyamines and polyalcohols such as ethyleneglycol, 1,4-butanediol, glycerol, diethanolamine; high-molecular compounds such as polyvinyl alcohol, polyallyl alcohol or methylcellulose; soluble starch, phenol-formaldehyde resins, urea-formaldehyde resins, melamine-formaldehyde resins, gelatin and albumin; particularly good dressings on leather are obtained on addition of hydrazine or hydrazine hydrate or of a salt of this base as cross-linking agent. Another suitable cross-linking agent is hydroxylamine.

Unless otherwise indicated, parts and percentages in the following Examples are by weight.

EXAMPLE 1

A stainless steel polymerization vessel equipped with agitator, thermometer, reflux condenser, gas inlet and 2 dropping funnels is charged with a solution of 600 parts of sodium laurylsulphate in 25,700 parts of water.

16,600 parts of acrylic acid ethyl ester, 3000 parts of acrylonitrile, 400 parts of acrolein and 400 parts of n-hexadecanol are emulsified in this solution. 35,000 parts of this emulsion are transferred to a storage vessel equipped with an agitator so that 11,700 parts of emulsion are left in the polymerization vessel. The temperature of the emulsion is adjusted to 10° C. by means of cooling water circulating in the boiler jacket and at the same time the air is displaced with nitrogen. The polymerization is initiated by adding ³⁄₄₀ each of the following solutions:

(a) 125 parts of hydrogen peroxide of 35% strength,
(b) a solution of 28 parts of ascorbic acid in 1400 parts of water,
(c) a solution of 0.056 part of Mohr's salt and 1.12 parts of sulphuric acid of 98% strength in 249 parts of water.

The remaining ³⁷⁄₄₀ of the solution (a) are added to the emulsion in the storage vessel; the remaining ³⁷⁄₄₀ of the solutions (b) and (c) are added at an even rate within 3 to 4 hours from the dropping funnels when polymerization has set in.

At the same time the emulsion from the storage vessel is run in within about 4 hours at 25 to 30° C.

After about 4 hours' polymerization the latex is heated within 30 minutes to 80° C. and maintained for 2½ hours at this temperature, then blown out and stirred until it is cold.

There are obtained 49,000 parts of latex of a concentration of 40.5%. The polymer yield amounts to 94%. The polymer emulsion is mixed with a solution of 396 parts of hydroxyethylated hydroabietyl alcohol, containing about 30 ethylene oxide equivalents, in 924 parts of water and adjusted with 2% aqueous sodium hydroxide solution to a pH of about 8 and diluted with water to a final concentration of 38%.

EXAMPLE 2

100 parts of a latex prepared as described in Example 1, after-stabilized by addition of hydroxyethylated hydroabietyl alcohol but not rendered alkaline, are mixed with 0.81 part of an aqueous hydrazine hydrate solution of 10% strength while being stirred, and then adjusted with 2% aqueous sodium hydroxide solution to pH=about 8 and diluted with water to a solids content of about 38%.

EXAMPLE 3

A monomer mixture of 41,500 parts of ethyl acrylate, 7,500 parts of acrylonitrile and 1,000 parts of acrolein is emulsified in a solution of 1,000 parts of sodium laurylsulphate and 1,000 parts of a water-soluble copolymer of ethylene oxide and propylene oxide in 63,750 parts of water, in the polymerization apparatus described in Example 1.

86,000 parts of the resulting emulsion are transferred to a storage vessel equipped with an agitator. The emulsion remaining in the polymerization vessel, 28,700 parts, is deaerated with nitrogen at about 13° C. and then ¹⁄₂₀ each of the following solutions is added:

(a) 313 parts of hydrogen peroxide of 35% strength,
(b) a solution of 70 parts of ascorbic acid in 3500 parts of water,
(c) a solution of 0.140 part of Mohr's salt and 2.8 parts of sulphuric acid of 98% strength in 622 parts of water.

The remaining ¹⁹⁄₂₀ of solution (a) are added to the emulsion in the storage vessel; the remaining ¹⁹⁄₂₀ of solutions (b) and (c) are dropped from the dropping funnels into the polymerization vessel when polymerization has set in at an even rate within 4 to 5 hours. At the same time the monomer emulsion from the storage vessel is added within about 3 hours at an even rate and at a polymerization temperature of about 25 to 30° C. About 2 hours after completion of the addition of the monomer emulsion the temperature of the batch is raised within 1 hour to 80° C. and maintained for 2 hours at this level. The resulting polymer emulsion is then blown out and stirred until it is cold, to yield 119.85 parts of a latex having a solids content of 42.4%.

The polymer yield amounts to 97.5%. The pH value of 59,000 parts of latex was adjusted with normal aqueous sodium hydroxide solution to 8, and its solids content with water to 38%.

EXAMPLE 4

59,000 parts of the latex of 42.4% strength obtained in Example 3 were mixed, while being stirred, with 500 parts of an aqueous hydrazine hydrate solution of 10% strength and then with 1,175 parts of normal aqueous sodium hydroxide solution, and the batch was finally adjusted with water to a concentration of 38%.

EXAMPLE 5

A polymerization vessel from glass, equipped with agitator, thermometer, gas inlet and outlet tubes, reflux condenser and dropping funnel is charged with 146 parts of an emulsion (a) from 5 parts of sodium laurylsulphate, 5 parts of a water-soluble copolymer from ethylene oxide and propylene oxide, 325 parts of water, 207.5 parts of ethyl acrylate, 37.5 parts of acrylonitrile and 5 parts of acrolein. The apparatus was scavenged with nitrogen and then, at 16° C., the polymerization initiated by adding ⅕ each of the following solutions:

(b) 1.6 parts of hydrogen peroxide of 35% strength,
(c) a solution of 0.4 part of ascorbic acid in 15 parts of water.

The remaining 584 parts of solution (b) are added to the remaining emulsion (a) which is run in within one hour after polymerization has set in. At the same time the ⅘ of solution (c) are dropped in through the dropping funnel at an even rate within 1½ hours. The polymerization temperature is then maintained at 25 to 30° C. by cooling. After about 4 hours' polymerization the internal temperature is raised to 75 to 80° C. and the polymerization is finalized within 2 hours at this temperature. After blowing out and stirring until the batch is cold, there are obtained 250.9 parts of a latex of 42.6% solids content in a yield of 97%.

The latex is adjusted with aqueous sodium hydroxide solution of 2% strength to pH 8 and with water to a dry content of 38%.

EXAMPLE 6

Chrome side leather is whetted twice with grinding paper No. 400 then after-tanned, predyed and treated with the following pigment finish dressing:

| | Parts |
|---|---|
| Casein-free topping dye | 100 |
| Water | 700 |
| Polymer dispersion according to Examples 1 to 5 | 200 |

The leather is plush-wheeled once with the above dressing, dried, ironed on a hydraulic press at 70° C. under 150 atmospheres (gauge) pressure and sprayed four times crosswise with the above dressing by means of a spray gun.

The finish obtained in this manner adheres well and is resistant to rubbing in the wet state, does not stick to the ironing plate in ironing and is distinguished by its resistance to hot ironing at 200° C.

EXAMPLE 7

A clothing leather is vigorously whetted with grinding paper No. 300, after-tanned and predyed black, and then treated with the following pigment finish dressing:

| | Parts |
|---|---|
| Commercial casein-free pigment paste | 150 |
| Water | 550 |
| Polymer dispersion prepared according to Examples 1 to 5 | 300 |

The leather is twice plush-wheeled with the above dressing, dried, ironed on a hydraulic press at about 60° C.

under 150 atmospheres (gauge) pressure, sprayed three times crosswise with the above dressing by means of a spray gun, dried and ironed on the hydraulic press at 60° C. under a pressure of 150 atmospheres (gauge).

The finish obtained in this manner does not stick to the pressure plate in ironing, has outstanding adhesion, good resistance to rubbing in the wet state and very good resistance to ironing at about 200° C.

When in the above example the casein-free pigment paste is replaced by a commercial casein topping dye, the resulting finish is likewise resistant to rubbing in the wet state and to hot ironing.

What is claimed is:

1. A stable aqueous dispersion of a ternary copolymer obtained by emulsifying in an aqueous medium in the presence of an emulsifier (a) 1 to 4 parts by weight of acrolein,
   (b) 10 to 20 parts by weight of acrylonitrile and
   (c) 79 to 85 parts by weight of ethyl acrylate, the sum $(a+b+c)$ always being 100 parts by weight, and copolymerizing the monomers in the emulsion by the redox method in the presence of hydrogen peroxide as oxidizing component, and of ascorbic acid as reducing component.

2. A dispersion according to claim 1, obtained by emulsifying in an aqueous medium in the presence of an emulsifier (a) 1 to 4 parts by weight of acrolein,
   (b) 10 to 20 parts by weight of acrylontrile and
   (c) 79 to 85 parts by weight of ethyl acrylate, the sum $(a+b+c)$ always being 100 parts by weight, and copolymerizing the monomers in the emulsion by the redox method in the presence of hydrogen peroxide as oxidizing component, and of ascorbic acid as reducing component, and of ferrous ions as activator.

3. A dispersion according to claim 1, obtained by emulsifying in an aqueous medium in the presence of an emulsifier (a) 1.5 to 3 parts by weight of acrolein,
   (b) 10 to 20 parts by weight of acrylonitrile and
   (c) 80 to 84 parts by weight of ethylacrylate, the sum $(a+b+c)$ always being 100 parts by weight, and copolymerizing the monomers in the emulsion by the redox method in the presence of hydrogen peroxide as oxidizing component, and of ascorbic acid as reducing component.

4. A dispersion according to claim 1, obtained by emulsifying in an aqueous medium in the presence of an emulsifier (a) 1.5 to 3 parts by weight of acrolein,
   (b) 12 to 18 parts by weight of acrylonitrile and
   (c) 80 to 84 parts by weight of ethylacrylate, the sum $(a+b+c)$ always being 100 parts by weight, and copolymerizing the monomers in the emulsion by the redox method in the presence of hydrogen peroxide as oxidizing component, and of ascorbic acid as reducing component, and of Mohr's salt as activator.

5. A dispersion according to claim 1, obtained by emulsifying in an aqueous medium in the presence of an emulsifier (a) 1.5 to 3 parts by weight of acrolein,
   (b) 12 to 18 parts by weight of acrylonitrile and
   (c) 80 to 84 parts by weight of ethylacrylate, the sum $(a+b+c)$ always being 100 parts by weight, and copolymerizing the monomers in the emulsion by the redox method in the presence of hydrogen peroxide as oxidizing component, and of ascorbic acid as reducing component, and of Mohr's salt as activator, the dispersion containing hydrazine hydrate as a cross-linking agent.

References Cited

UNITED STATES PATENTS

| 3,084,992 | 4/1963 | Schlack et al. | 260—73 |
| 3,154,599 | 10/1964 | Wismer et al. | 260—73 |

OTHER REFERENCES

Chemical Abstract, volume 54 (1960), pages 7235–7236.

MURRAY TILLMAN, Primary Examiner

W. J. BRIGGS, Assistant Examiner

U.S. Cl. X.R.

117—139.5, 142, 155; 260—73, 80.81

CASE CM-1/E D

PO-1050
(5/69)

UNITED STATES PATENT OFFICE
CERTIFICATE OF CORRECTION

Patent No. 3,455,861            Dated July 15, 1969

Inventor(s) ANGELO BRESCIANI ET AL

It is certified that error appears in the above-identified patent and that said Letters Patent are hereby corrected as shown below:

Column 5, line 41, "10 to 20" should read --- 12 to 18 ---.

SIGNED AND
SEALED
JAN 5 1971

(SEAL)
Attest:

Edward M. Fletcher, Jr.
Attesting Officer

WILLIAM E. SCHUYLER, JR.
Commissioner of Patents